United States Patent [19]

Ball

[11] Patent Number: 4,562,857
[45] Date of Patent: Jan. 7, 1986

[54] THERMAL INSULATION ARTICLE

[76] Inventor: Randell D. Ball, 1141 Elk, Yukon, Okla. 73099

[21] Appl. No.: 533,238

[22] Filed: Sep. 19, 1983

[51] Int. Cl.$^4$ .............................................. F16L 7/00
[52] U.S. Cl. ................................... 137/375; 137/382; 220/4 B; 220/469; 285/47
[58] Field of Search ................. 137/375, 382; 220/4 B, 220/4 E, 4 R, 444, 469, 85 P; 215/13 R; 285/47, 48

[56] References Cited

U.S. PATENT DOCUMENTS

| 976,475 | 11/1910 | Livingston | 137/382 |
|---|---|---|---|
| 1,084,996 | 1/1914 | Wright | 137/382 |
| 2,404,736 | 7/1946 | Marick . | |
| 2,518,863 | 8/1950 | Camden, Jr. et al. . | |
| 3,038,633 | 6/1962 | Foster | 137/382 |
| 3,120,600 | 2/1964 | True . | |
| 3,275,803 | 9/1966 | True . | |
| 3,374,338 | 3/1968 | Morey . | |
| 3,556,158 | 1/1971 | Schneider | 220/444 |
| 3,657,517 | 4/1972 | Hoyt . | |
| 3,724,491 | 4/1973 | Knudsen et al. | 137/375 |
| 3,731,534 | 5/1973 | Painley et al. . | |
| 4,061,898 | 12/1977 | Murray et al. . | |
| 4,191,524 | 3/1980 | Thorn . | |
| 4,207,918 | 6/1980 | Burns et al. | 137/375 |
| 4,259,981 | 4/1981 | Busse | 137/375 |
| 4,301,828 | 11/1981 | Martin, Jr. | 137/382 |

FOREIGN PATENT DOCUMENTS 42862 4/1979 Japan .
159749 12/1979 Japan .

Primary Examiner—A. Michael Chambers
Assistant Examiner—Sheri M. Novack
Attorney, Agent, or Firm—E. Harrison Gilbert, III

[57] ABSTRACT

An article for thermally insulating an object, such as a valve found at a well site, includes a housing comprising three housing members which are separable from each other to facilitate connection around the object to be insulated. Two of the housing members which protect the main body of the object to be insulated have at least a double-wall construction, which walls are separated by at least one layer of insulation material. When the three housing members are adjoined, they define a cavity or interior hollow region in which the object to be insulated is placed.

12 Claims, 18 Drawing Figures

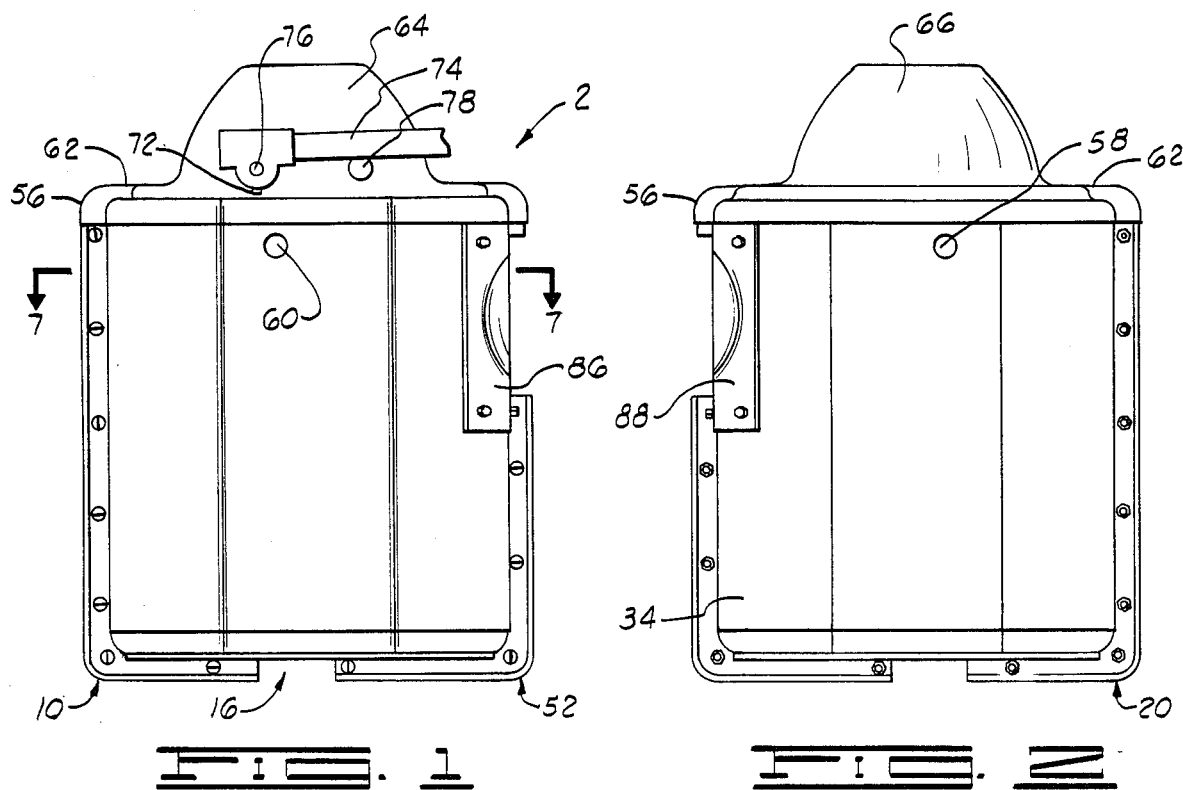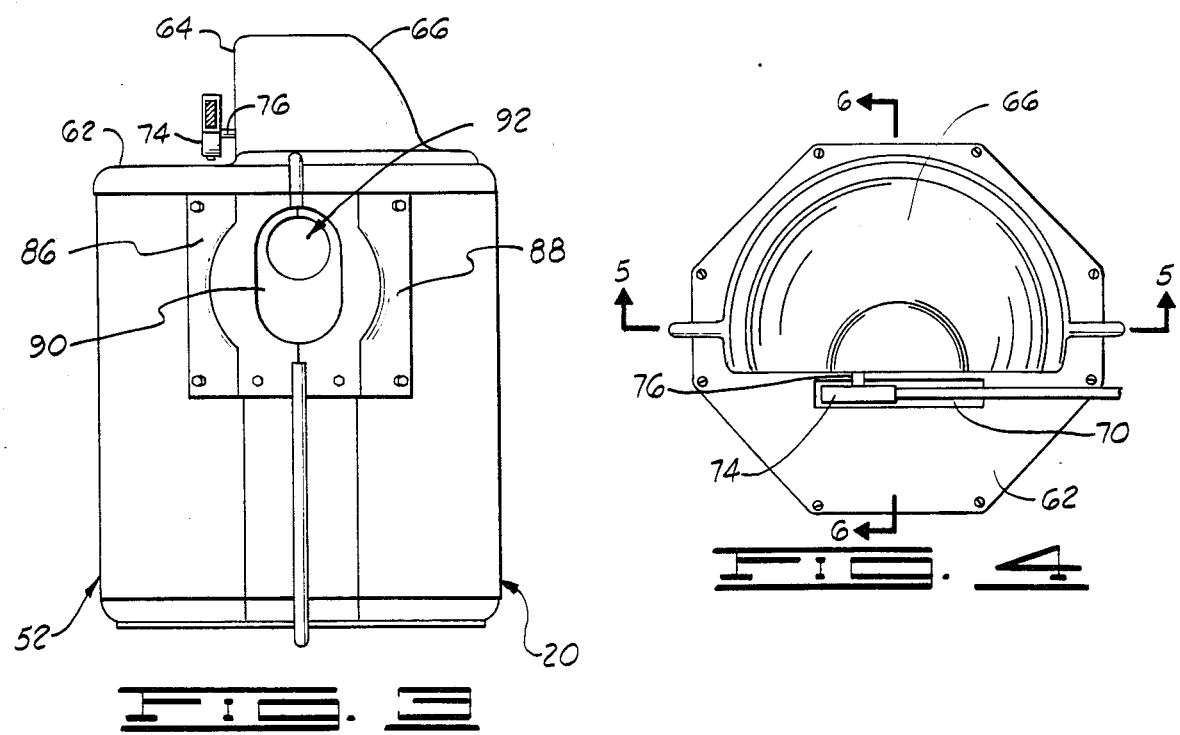

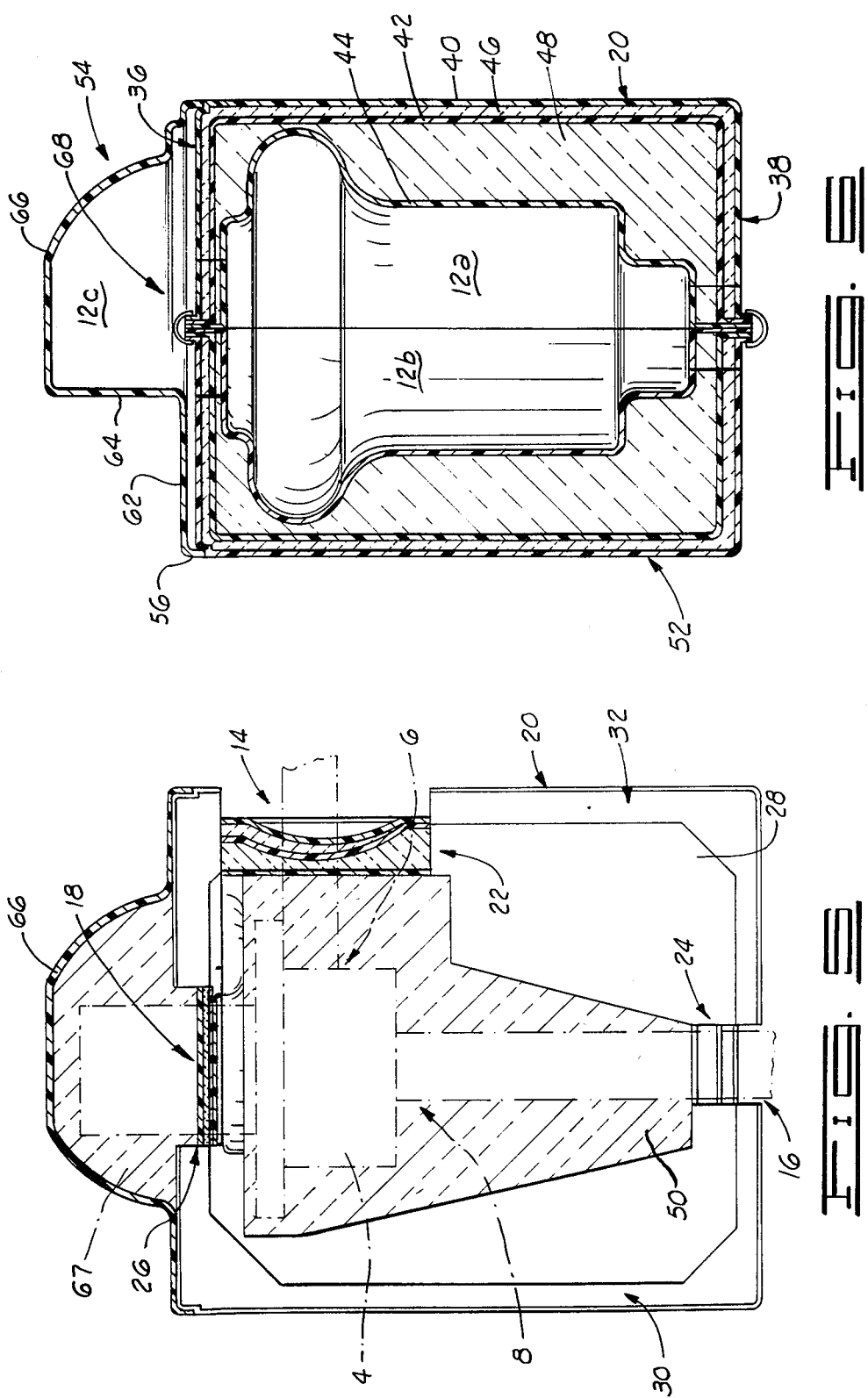

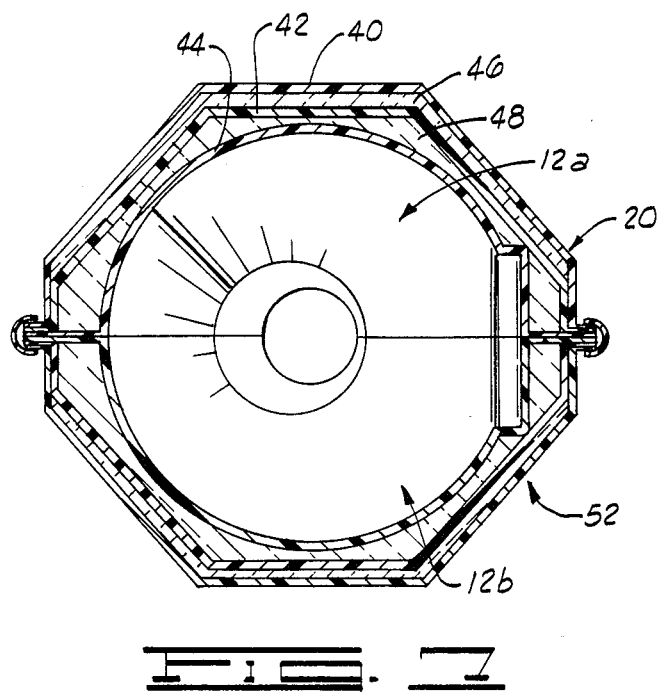
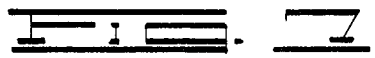
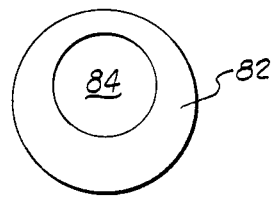
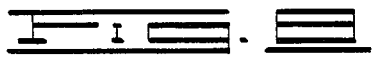
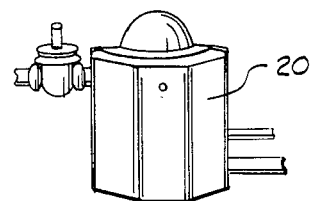
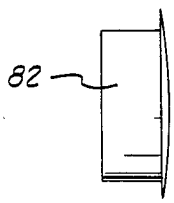
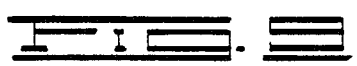
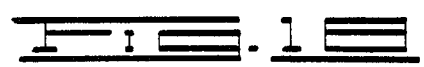

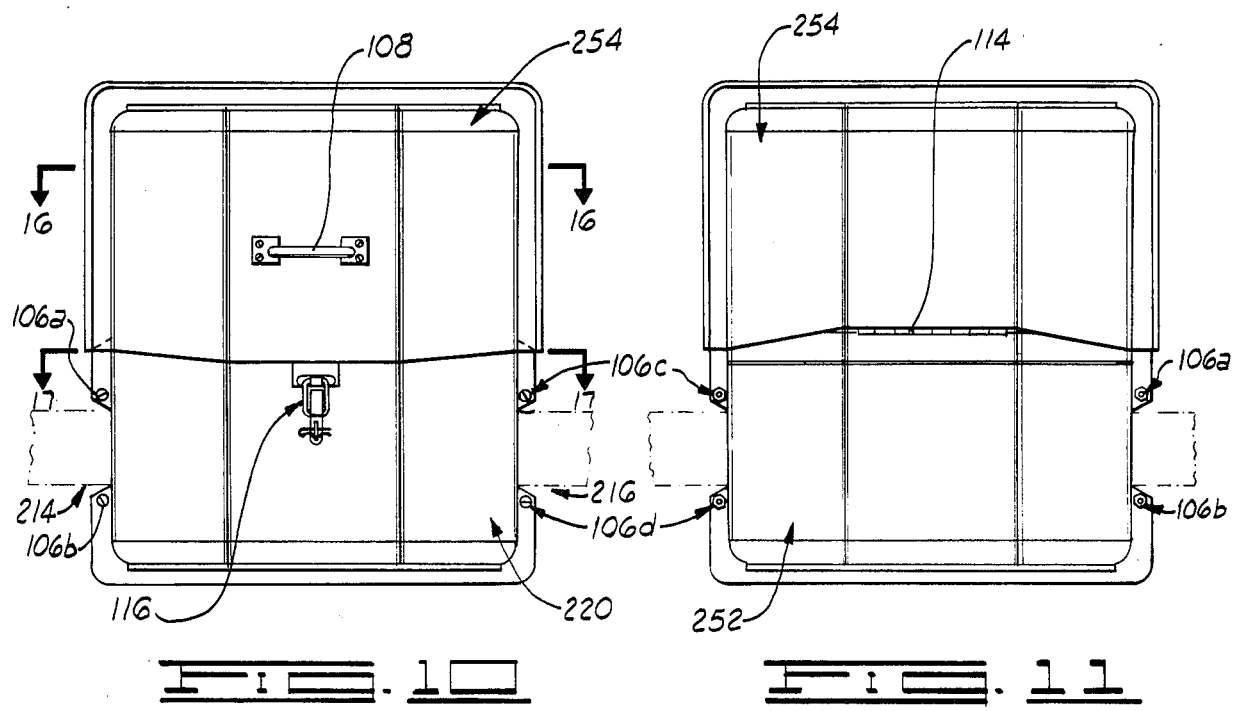
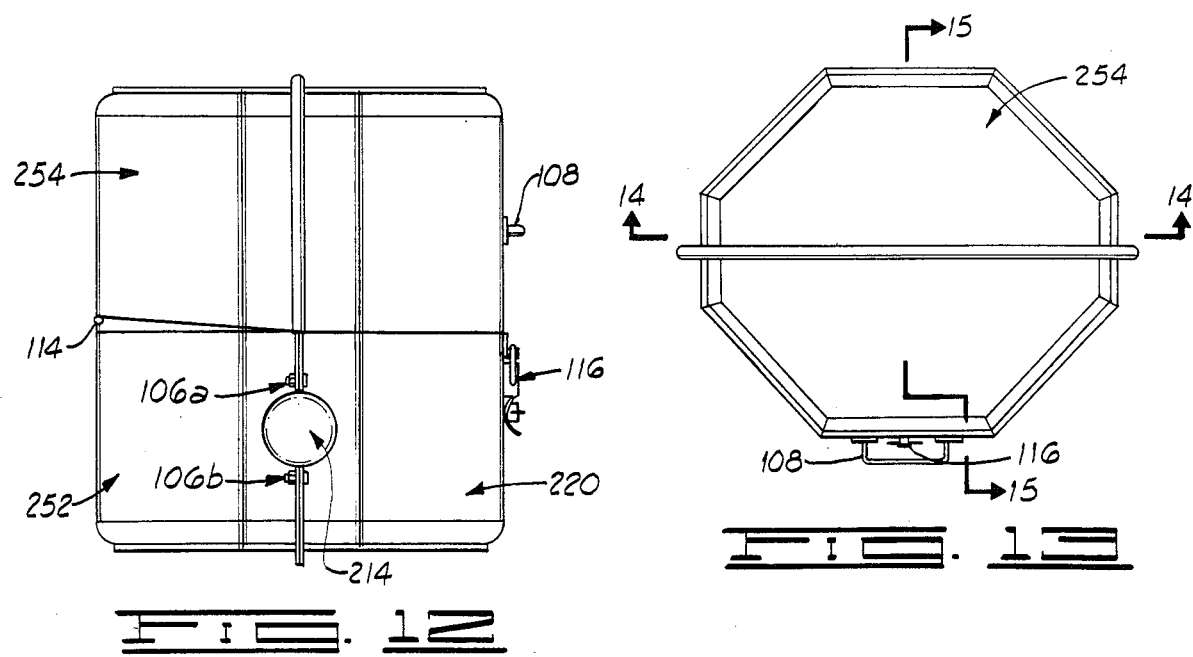

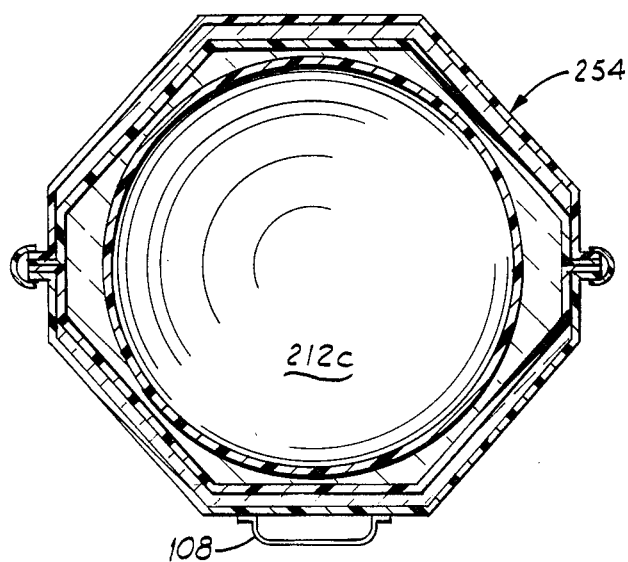
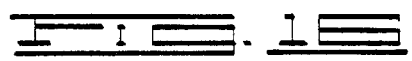
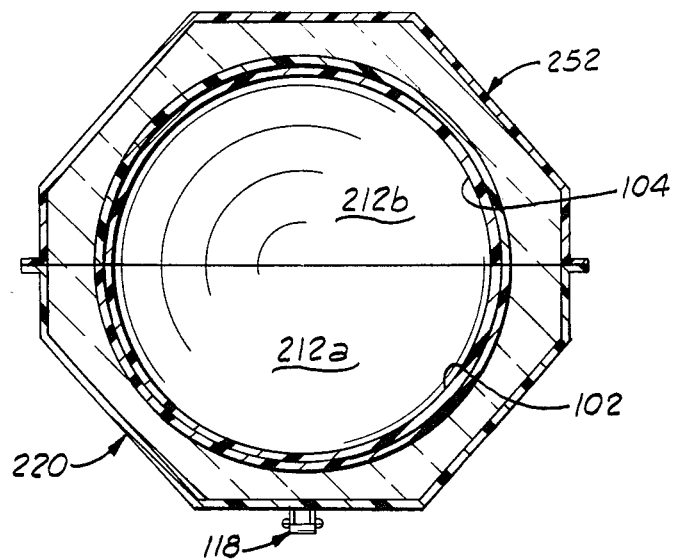
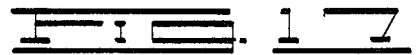

THERMAL INSULATION ARTICLE

BACKGROUND OF THE INVENTION

This invention relates generally to articles for thermally insulating an object and more particularly, but not by way of limitation, to articles for thermally insulating valves found at well sites.

The outdoor utilization of operational equipment often requires the insulation of the equipment to insure that it does not freeze and become inoperable during cold weather. For example, at a well site, various valves are used for controlling the flows of fluids. These valves are exposed to the elements so that they are susceptible to freezing during cold weather. Typical valves found at a well site include mechanical and gas-operated valves such as dump valves and back-pressure valves. These types, as well as others, are known to the art and are manufactured by companies such as Kimray and N. C. NATCO.

These valves need to be insulated to prevent them from freezing because they include various parts which can become frozen during cold weather. For example, the lower body of a dump valve can freeze due to liquids contained therein and the top portion of the dump valve can freeze due to the wet gas contained therein. By way of another example, a Kimray back-pressure gas valve known to the art, which valve regulates gas flow to the sales line and to bleed-off lines, includes a bottom portion which is particularly susceptible to freezing.

In view of the susceptibility of such objects to freezing, there is the need for an article for thermally insulating these objects. With respect to valves found at well sites, previous attempts have been made to insulate the valves. One of these attempts includes coating the valve with a spray-on foam insulation. This type does function to insulate the valves; however, it is difficult to remove once it is applied. Furthermore, it requires the presence of spray equipment for applying the substance.

Another type of prior insulator is a metal box containing a suitable insulation material which fits around the valve. This type of article has a substantially rectangular or trapezoidal cross section thereby indicating the presence of corners and the like which can impede the utilization of this type when pipes and other conduits or structures are located near the valve which is to be insulated.

Therefore, there is the need for an article for insulating objects, which article is easy to be mounted onto and removed from the object. There is also the need for such an article to protect the entire object from freezing, but to also permit access to at least a portion of the object without complete removal of the article. Such an article should also be shaped to avoid interference with working parts of the object and adjacent structures. This article should also be constructed to be waterproof, durable, and versatile so that it can be used with different types of objects in different environments.

SUMMARY OF THE INVENTION

The present invention overcomes the above-noted and other shortcomings of the prior art by providing a novel and improved article for thermally insulating an object, such as a valve found at a well site. The present invention can be easily mounted on and removed from the object; and when it is mounted on the object, it protects the entire object from freezing, but does permit access to at least a portion of the object without being totally removed. The present invention is constructed in a shape which avoids interference with working parts of the object and adjacent structures. It is also constructed to be waterproof, durable and versatile so that it can be used with various types of objects and in different environments.

Broadly, the present invention provides an article comprising a first housing having a first cavity defined therein for receiving a first portion of the object and a second housing having a second cavity defined therein for receiving a second portion of the object. The article further comprises a third housing having a third cavity defined therein for receiving a third portion of the object. The third housing has an edge defined therein for mating with a complementary edge defined when the first housing is connected to the second housing. The article also comprises means for connecting the first, second and third housings so that the first, second and third cavities adjoin to define an insulated interior region for receiving the object.

The first housing has an exterior shape defined by a first surface having two edges and by a second surface extending between the two edges of the first surface at oblique angles thereto. The second housing is similarly shaped. Each of the first and second housings of the preferred embodiment includes an outer shell, an inner shell, insulation means disposed between the outer shell and the inner shell, and means for joining the inner shell with the outer shell.

Therefore, from the foregoing, it is a general object of the present invention to provide a novel and improved article for thermally insulating an object. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a first elevational view of a first preferred embodiment of the present invention.

FIG. 2 is a second elevational view of the first preferred embodiment of the present invention.

FIG. 3 is a third elevational view of the first preferred embodiment of the present invention.

FIG. 4 is a top plan view of the first preferred embodiment of the present invention.

FIG. 5 is a cross-sectional elevational view of the first preferred embodiment of the present invention as taken along line 5—5 shown in FIG. 4.

FIG. 6 is a cross-sectional elevational view of the first preferred embodiment of the present invention as taken along line 6—6 shown in FIG. 4.

FIG. 7 is a cross-sectional plan view of the first preferred embodiment of the present invention as taken along line 7—7 shown in FIG. 1.

FIG. 8 is a first elevational view of a plug used in the first preferred embodiment of the present invention.

FIG. 9 is a second elevational view of the plug used with the first preferred embodiment of the present invention.

FIG. 10 is a first elevational view of a second preferred embodiment of the present invention.

FIG. 11 is a second elevational view of the second preferred embodiment of the present invention.

FIG. 12 is a third elevational view of the second preferred embodiment of the present invention.

FIG. 13 is a top plan view of the second preferred embodiment of the present invention.

FIG. 16 is a cross-sectional plan view of a third housing member of the second preferred embodiment of the present invention as taken along line 16—16 shown in FIG. 10.

FIG. 17 is a cross-sectional plan view of first and second housing members of the second preferred embodiment of the present invention as taken along line 17—17 shown in FIG. 10.

FIG. 18 is an illustration of the two illustrated embodiments shown in association with well site structures.

DETAILED DESCRIPTION OF THE PREFERRED EMBODIMENTS

Figure 14:
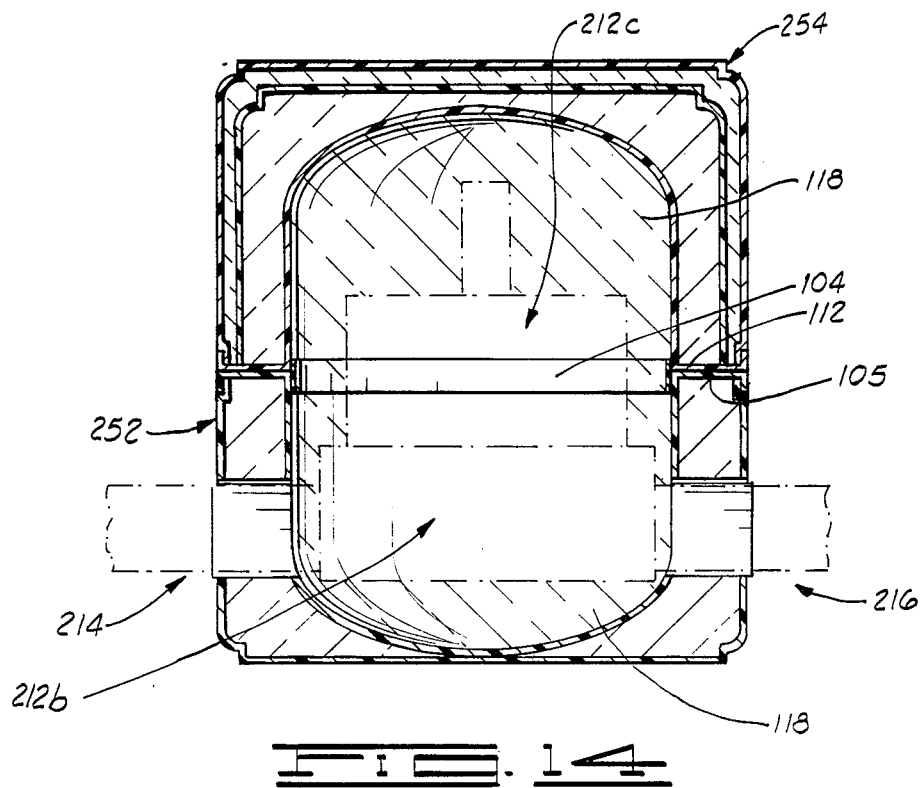
FIG. 14 is a cross-sectional elevational view of the second preferred embodiment of the present invention as taken along line 14—14 shown in FIG. 13.

With reference to the drawings, the preferred embodiments of the present invention will be described. Initially, however, it is to be noted that the specific embodiments which are described hereinbelow are specifically designed for use with Kimray and N. C. NATCO mechanically or gas-operated valves, such as dump valves and back-pressure valves; however, the present invention can be used with other types of valves and objects.

The present invention generally provides an article 2 for thermally insulating an object, such as a valve 4 having a first port 6 and a second port 8 as shown in dot-dash lines in FIG. 5. The article 2 is shown in a first embodiment in FIGS. 1-9 and in a second embodiment in FIGS. 10-17. The general features of both of these embodiments will initially be described with reference to the embodiment shown in FIGS. 1-9, followed by a description of the more particular elements of each of the two embodiments.

The article 2 generally includes a housing 10 having a cavity defined in three portions 12a, 12b, 12c (see FIG. 6) for receiving at least a portion of the object. The cavity portions 12a, 12b, 12c are shaped to accommodate a variety of types of objects, such as different types of valves used in association with oil or gas wells. One such shape is illustrated in FIGS. 5 and 6; however, other shapes can be used. The housing 10 also has a first opening 14 in communication with the cavity to provide access to the object, such as to the first port 6 of the valve 4. The housing 10 has a second opening 16 in communication with the cavity to provide access to the object, such as to the second port 8 of the valve 4. A third opening 18 is also defined in the housing 10 in communication with the cavity. The remainder of the valve not received within the cavity portions 12a, 12b of the housing 10 extends through the third opening 18.

The housing 10 includes a first housing member 20 having the portion 12a of the cavity and portions of the first opening 14, second opening 16 and a third opening 18 defined therein. Channels 22, 24, 26 are defined in the first housing member 20 to communicate the cavity portion with the opening portions and exterior of the housing member 20.

The first housing member 20 has an exterior shape defined by a first surface 28 having two edges 30, 32 and by a second surface 34 having beveled side portions extending between the two edges 30, 32 of the first surface 28 at oblique angles thereto. As shown in the drawings, the first surface 28 can be referred to as an inner surface into which the channels and cavity portion are defined. The second surface 34 is the exterior surface of the first housing member 20 and has in the preferred embodiment an angular configuration whereby the outer cross-sectional appearance of the first housing member 20 has the general shape of a hexagon. Extending between the first and second surfaces 28, 34 are a top surface 36 and a bottom surface 38.

In general, the first housing member of the present invention includes at least an inner shell and an outer shell which are joined to define an interior void region in which insulation can be retained. More particularly and as indicated in FIG. 6, the first preferred embodiment of the first housing member 20 has a molded plastic construction including an outer shell 40 having the beveled configuration, a middle shell 42 and an inner shell 44 providing the inner surface and the definition of the cavity portion 12a of the first housing member 20. Disposed between the outer shell 40 and the middle shell 42 is a first insulation means, such as a quarter inch of fiber glass insulation 46 as illustrated in FIG. 6. Disposed between the middle shell and the inner shell 44 is a second insulation means, such as one to two inches of the polyurethane insulation 48 in the preferred embodiment. These elements of the construction of the first housing member 20 are joined by suitable means, such as by gluing. Further insulation means is provided by insulation batt material 50 disposed loose within the cavity portion 12a of the first housing member 20. The material 50 is loose so that it can be easily replaced should the device housed within the present invention leak a liquid. The insulation 46 and 48 is protected from any such leaked liquid by the plastic walls of the housing members.

The housing 10 also includes a second housing member 52 constructed substantially identical to the first housing member 20. In particular, the second housing member has the second portion 12b of the cavity of the housing 10 defined therein for receiving a second portion of the object. The second housing member 52 also includes respective portions of the first, second and third openings 14, 16, 18 and has channels defined therein for communicating these openings with the cavity portion defined therein. The shape and construction of the second housing member 52 is identical to the first housing member 20; therefore, these aspects of the second housing member 52 will not be further described.

The housing 10 further includes a third housing member 54 having the third portion 12c of the cavity of the housing 10 defined therein. This third cavity portion 12c receives a third portion of the object which is to be insulated by the article 2. The third housing member 54 has an edge 56 defined therein for mating with a complementary edge defined when the first housing member 20 is connected to the second housing member 52. To connect the first housing member 20 to the second housing member 52 and to connect the third housing member 54 to the first and second housing members so that the respective portions of the cavities adjoin to define the cavity of the housing wherein an insulated interior region is provided for receiving the object to be insulated, the article 2 comprises suitable connecting means.

The connecting means includes first connecting means for connecting the first housing member 20 to the second housing member 52 so that the inner surfaces of the two housing members are adjacent and so that, in the preferred embodiment, the hexagonal outer cross-sectional configurations of the two housing members are joined to form a generally octagonal cross-sectional configuration. This connecting is also performed so that the channels of the first and second housing members are aligned to define passageways from the housing cavity to the exterior surfaces at the openings 14, 16, 18. The first connecting means of the illustrated embodiments includes flanged outer edge portions (such as edge portions 30, 32 identified in FIG. 5) of the housing members 20, 52 which are connected together by nuts and bolts as illustrated, for example, in FIGS. 1-2. The joined edges can be made water-tight by suitable means known to the art, such as an edge bead shown associated with the first illustrated embodiment of the first and second housing members or such as caulking as is indicated hereinbelow to be usable with the second illustrated embodiment.

The connecting means also includes a second connecting means for connecting the third housing member 54 to the first and second housing members 20, 52. The connecting means will be more particularly described hereinbelow with reference to the detailed descriptions of the individual embodiments shown in the drawings.

With reference to FIGS. 1-9, additional features of the first preferred embodiment will be described. In this embodiment, the first, second and third openings 14, 16, 18 are defined in the side, bottom, and top, respectively, of the housing 10 as indicated in the drawings. The first and second openings 14, 16 are disposed at a right angle to each other. The third opening 18 is at a right angle to the first opening 14 and provides a port through which an upper portion of the object can extend. The drawings also show that the first and second housing members 20, 52 have respective holes 58, 60 defined therein for permitting wires to be inserted into the interior of the housing or to provide access for a gas line input or adjustment mechanism for use with the insulated object, such as the valve 4, as known to the art.

The portion of the insulated object which extends through the third opening 18 disposed in the top of the housing members 20, 52 is insulated by means of the third housing member 54 which is shown in the drawings to include a first wall 62, a second wall 64 and a third wall 66 and to include loose insulation batt material 67 (see FIG. 5).

The first wall 62 of the preferred embodiment is substantially flat and terminates at a perimeter bound by the depending edge 56 which overlaps the edge defined by the first and second housing members 20, 52 when they are connected. This edge of the first and second housing members 20, 52 is defined in the first preferred embodiment by an outwardly extending surface and rounded corner located at the top of the first and second housing members 20, 52 as shown in FIGS. 5 and 6. This permits engagement between the lower surface of the edge 56 and the upper face of the outwardly extending surface of the edge of the first and second housing members 20, 52 whereby the third housing member 54 can be maintained in a relatively constant spatial relationship with the housing members 20, 52. The importance of this relatively constant spatial relationship will be described hereinbelow.

The first wall 62 also has an opening 68 defined in the interior thereof to provide a mouth to the cavity portion 12c defined within the third housing member 54. Also defined in the first wall 62 adjacent the second wall 64 is an indentation 70 (see FIG. 4). This indentation 70 in the preferred embodiment accommodates a set screw 72 which retains an actuating arm 74 to a valve stem or valve operating element 76 of the valve retained within the illustrated housing 10. In the preferred embodiment the first wall 62 has a shape which enables it to be reversibly mounted on the top of the first and second housing members 20, 52.

The second wall 64 of the third housing members 54 extends substantially perpendicularly from the first wall 62 near the center thereof. The second wall 64 defines a side of the cavity portion 12c and thus is disposed adjacent the opening 68 defined in the first wall 62. The second wall 64 has two holes (one of which is not visible, but which has the element 76 extending therethrough; the other of which is identified by the reference numeral 78) defined therein as shown in the drawings. These two holes permit the element 76 of the valve with which the preferred embodiment is to be used to extend to the exterior of the housing for connection to the actuating arm 74. It is to insure that these holes are properly positioned relative to the valve 4 and valve element 76 when the first and second housing members 20, 52 are mounted on the valve 4 that the edge 56 of the third housing member 54 must properly mate with the edge of the first and second housing members 20, 52 so that a relatively constant spatial relationship results.

The third wall 66 of the third housing member 54 extends between the first and second walls 62, 64 for defining another side of the cavity portion 12c. The third wall 66 cooperates with the second wall 64 so that the entire hollow interior region of the cavity portion 12c within the third housing member 54 is defined. The third wall 66 of the first preferred embodiment has a rounded shape but with a relatively flattened top.

The third housing member 54 of the embodiment shown in FIGS. 1-9 is attached to the first and second housing members 20, 52 by the second connecting means which enables the third housing member 54 to be reversibly connected to the first and second housing members. That is, the second connecting means enables the third housing member 54 to be connected to the first and second housing members 20, 52 in either a first position wherein the third wall 66 of the third housing member 54 extends from the second wall 64 in a direction toward the first housing member 20 or in a second position wherein the third wall 66 extends from the second wall 64 in a direction toward the second housing member 52. In the preferred embodiment the second connecting means includes appropriately spaced holes defined in the housing members and screws by means of which the third housing member can be connected in either of the aforementioned two positions (see FIG. 4 for locations of screws in the first preferred embodiment). This type of connecting means provides a versatility to the embodiment of FIGS. 1-9 because this embodiment can be used with a valve or other object oriented in either a left-hand or right-hand position.

To further make the embodiment of FIGS. 1-9 more versatile, the embodiment also includes a cylindrical plug 82 (see FIGS. 8-9) which can be snapped into and out of, and thus releasably retained in, either of the two holes defined in the second wall 64 of the third housing member 54. Defined through the plug 82 is an eccentrically positioned opening 84. The plug 82 and opening 84 can accommodate differently positioned elements of different valves with which the article 2 can be used. For example, the plug 82 can be installed in the hole as shown in the drawings; or when the third housing member 54 is reversed, the plug 82 can be inserted into the hole 78. Because elements which are to extend through either one of the holes are not always at the same position, the eccentric hole 84 can be moved by rotating the plug 82 within the hole of the second wall 64 to accommodate the position of the particular object with which the article 2 is being used.

The embodiment shown in FIGS. 1-9 also includes cover means, connectible to the first and second housing members 20, 52, for covering a portion of the first opening 14. In the preferred embodiment the first opening 14 is sufficiently large to receive a relatively large flanged connection. However, due to the versatility of the embodiment shown in FIGS. 1-9 the article 2 can be used with smaller sized pipes and couplings which pass through the first opening 14. To insure that these connections are adequately covered for thermal insulation, the present invention includes the cover means which can be attached to the first and second housing members 20, 52 to reduce the effective size of the first opening 14. The cover means of the preferred embodiment includes two separate pieces 86, 88 of molded plastic, each having a notch defined therein and mounting flange feet having holes therethrough for receiving screws by means of which the pieces 86, 88 are connected to the first and second housing members 20, 52 as shown in FIGS. 1-3. When the pieces 86, 88 are attached to the housing members 20, 52, the notches of the pieces adjoin to define a generally elliptical or oval opening as shown in FIG. 3.

To further protect smaller pipes and the like passing through the first opening 14, the embodiment shown in FIGS. 1-9 further includes insert means, connectible to the object passing through the first opening 14, for cooperating with the cover means to cover a greater portion of the first opening 14. In the first preferred embodiment the insert means includes a circular piece 90 of plastic having an eccentric hole 92 defined therein and a circular piece of plastic having a centrally positioned hole defined therein (not shown). The circular plastic piece 90 is cut from its outer periphery to the periphery of the eccentric hole 92 to enable the insert means to be retained on the element passing through the first opening to the object insulated within the article 2. The piece 90 is shown in FIG. 3 as if it were hung on a pipe passing through the opening 14. The other, nonillustrated piece is similarly constructed, but with the hole centrally located. These two pieces enable the first embodiment to be used with a variety of objects. For example, if the object retained within the housing 10 has its first port 6 centered, or only slightly offset from center, in or relative to the first opening 14, then the piece with the centered hole can be used to cooperated with the cover pieces 86, 88 and the generally elliptical or oval opening defined thereby so that the first opening 14 is thereby covered up to the sides of the pipe or coupling passing through the opening 14 to the first port 6. If the port 6 is farther off-center, then the piece 90 can be similarly used.

With reference to FIGS. 10-17, the details of the second preferred embodiment will be described. It is to be noted that elements of the second illustrated embodiment which correspond to ones in the first illustrated embodiment are indicated with like reference numerals preceded by the numeral "2."

In this second illustrated embodiment the housing has the aforementioned cavity portions (enumerated 212a, 212b, 212c) defined therein as well as first and second openings 214, 216 for providing access to the object, such as a gas back pressure regulator, which can be disposed in the cavity portions. In the second embodiment these two openings are collinear as indicated in FIGS. 10, 11 and 14.

Figure 15:
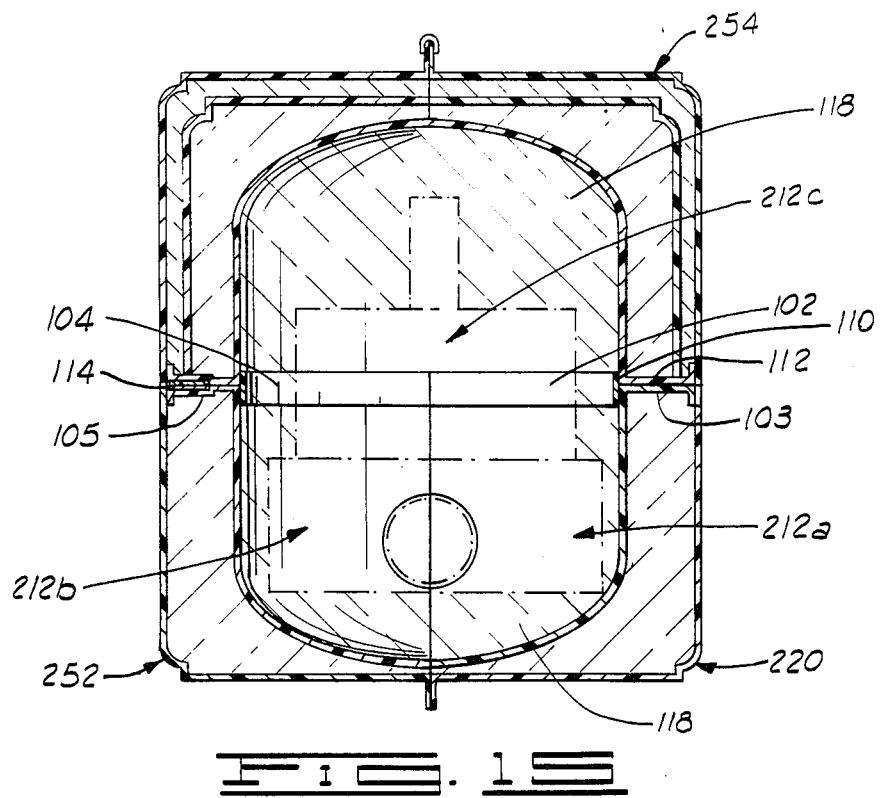
FIG. 15 is a cross-sectional elevational view of the second preferred embodiment of the present invention as taken along line 15—15 shown in FIG. 13.

In this second embodiment, the first housing member 220 includes a rim 102 extending away from the surface of a top wall 103 about a periphery of the cavity portion 212a defined therein (see FIGS. 15 and 17). The rim 102 protrudes upwardly from an edge of the cavity portion 212a as shown in FIG. 15. The second housing member 252 includes a similar rim which is identified by the reference numeral 104 (see FIGS. 14 and 17). This rim 104 extends from the edge of the cavity portion 212b defined in a top wall 105 of the second housing member 252. When the first and second housing members 220, 252 are connected by the first connecting means which includes nuts and bolts 106a, 106b, 106c, 106d in the second illustrated embodiment, the rims 102, 104 adjoin to define a continuous lip along a mouth of the adjoined cavity portions 212a, 212b. This continuous lip extends around the entire periphery of the mouth of the adjoined cavities as shown in FIG. 17.

As shown in FIGS. 14, 15 and 17, the first and second housing members 220, 252 of the second illustrated embodiment are constructed with inner and outer shells with insulation disposed therebetween. The shells are constructed so that each of these two housing members is enclosed by outer walls of plastic in the second preferred embodiment. These two housing members also include outer flanged edges in the second illustrated embodiment. The tops of these side edges are angled and disposed sufficiently high on the sides of the housing members 220, 252 so that they extend into complementary flanged edges of the third housing member 254 as shown in FIG. 14. This construction insures that fluid, such as rain, running down the sides of the third housing member 254 will not leak into the first and second housing members 220, 252 through the tops of these lower flanged edges, Additionally, these flanged edges of the first and second housing members 220, 252 are terminated adjacent the openings 214, 216 at angles (approximately 45° in the second illustrated embodiment) so that different types of connections for the insulated object can be accommodated.

The third housing member 254 of the second preferred embodiment is constructed in a triple shell similar to the first and second housing members of the first illustrated embodiment and of a shape similar to that of the adjoined first and second housing members 220, 252 (which is similar to the shape of the first and second housing members of the first illustrated embodiment); however, the third housing member 254 is a unitary structure in that it is not made of two separate parts which would correspond to the first and second housing members 220, 252. The third housing member 254 includes the cavity portion 212c defined therein for covering the top of the object retained within the entire hollow interior region defined by all the cavity portions 212a, 212b, 212c of the second preferred embodiment. Attached to the third housing member 254 is a handle 108 for enabling the third housing member 254 to be moved away from a closed position wherein the third housing member 254 is adjacent the first and second housing members 220, 252 as shown in FIGS. 10-15.

The third housing member 254 is connected to the first and second housing members 220, 252 by the second connecting means of the second preferred embodiment. The second connecting means of this embodiment includes means for attaching the third housing 254 member to the adjoined first and second housing 220, 252 members so that the continuous lip is received within the cavity portion 212c of the third housing member 254 through a mouth thereof defined by an inner edge 110 of a lower or bottom wall 112 of the third housing member 254. By constructing the second preferred embodiment so that the continuous lip enters the third cavity 212c through the mouth, a barrier for preventing fluid (such as rain) from entering the adjoined cavities between the upper walls 103, 105 of the first and second housing members 220, 252 and the lower wall 112 of the third housing member 254 is provided. The second connecting means of the second illustrated preferred embodiment includes a hinge 114 for pivotally connecting the third housing member 254 to the adjoined first and second housing members 220, 252. When the third housing member 254 is in its closed position, it is releasably secured adjacent the first and second housing members 220, 252 by suitable latch means, such as of the type identified in FIGS. 10 and 12 by the reference numeral 116.

Insulation batting 118 can be used in the adjoined cavity portions 212a, 212b, 212c to further insulate the object retained within the second preferred embodiment of the article 2.

Having described the structure of the two embodiments, examples of their uses will next be described. In using the first preferred embodiment, the third housing member 56 is removed from the first and second housing members 20, 52 and the first and second housing members 20, 52 are disconnected by removing the edge bead and the connecting nuts and bolts. The first and second housing members 20, 52 are then placed around the object to be thermally insulated and connected together by the nuts and bolts shown in the drawings. Next, the third housing member 56 is connected in its proper position to the top of the adjoined first and second housing members 20, 52. The third housing member 56 is mounted so that an outwardly extending element, such as the valve stem 76, of the insulated object extends through one of the holes in the side wall 64 (particularly through the eccentric opening defined in the plug). The cover means and insert means are then connected as needed.

The second preferred embodiment is used by disconnecting the first housing member 220 from the second housing member 252 and positioning the two members on opposite sides of the object to be insulated. When these two housing members are properly positioned, they are connected by suitable means, such as the nuts and bolts 106a, 106b, 106c, 106d illustrated in the drawings. In using the second preferred embodiment, the third housing member 256 need not be removed from its association with the particular one of the first and second housing members to which it is hingedly connected. However, it can be removed to facilitate handling and positioning of the first or second housing member to which it is connected. Once the first and second housing members 220, 252 are connected and the third housing member 254 hinged to the respective housing member, the third housing member 254 is pivoted to its closed position and latched with the latch 116. In this position a continuous lip extends above the lower edge of the cavity 212c defined in the third housing member 254 so that any fluid, such as water, which is able to enter between the adjacent surfaces of the top sides 103, 105 of the adjoined first and second housing members 220, 252 and the lower surface 112 of the third housing member is prevented from dripping into the cavity defined by the adjoined first, second and third housing members. The adjoined side edges of housing members 220, 252 can be caulked or otherwise suitably covered or sealed to prevent leakage.

These uses of the illustrated embodiments are illustrated in FIG. 18 as well as in the several other drawings wherein the object to be thermally insulated is shown in dot-dash line. It is to be noted that the present invention can be used with heat tracing or control apparatus in a manner as is described in my copending patent application entitled WELL-SITE INSULATED HEATING APPARATUS, U.S. Pat. Application Ser. No. 533,069 filed Sept. 19, 1983. It is contemplated, for example, that a flat, ringlike heating member can be used within the structure of the present invention with the types of valves disclosed herein.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An article for thermally insulating a valve at a well site, said valve having a first port and a second port, said article comprising:

a housing having a cavity defined therein for receiving said valve, having a first opening defined therein in communication with said cavity to provide access to said first port, having a second opening defined therein in communication with said cavity to provide access to said second port, and having a third opening defined therein in communication with said cavity, said housing including:

a first housing member having an exterior shape defined by a first surface having two edges and by a second surface having beveled side portions extending between said two edges of said first surface at oblique angles thereto so that the outer cross section of said first housing member is characterized by a first polygon;

a second housing member having an exterior shape defined by a third surface having two edges and by a fourth surface having beveled side portions extending between said two edges of said third surface at oblique angles thereto so that the outer cross section of said second housing member is characterized by said first polygon; and connecting means for connecting said first housing member to said second housing member about said valve so that said first surface is adjacent said third surface and said first polygonal outer cross sections of said first and second housing members are combined to provide said housing with an outer cross section characterized by a second polygon different from said first polygon, said second polygon defining a shape for avoiding interference with said valve and adjacent structures with which said valve is associated.

2. An article as defined in claim 1, further comprising:
cover means, connectible to said first and second housing members, for covering a portion of said first opening; and
insert means, connectible to a pipe connected to said first port of said valve, for cooperating with said cover means to cover a greater portion of said first opening.

3. An article as defined in claim 1, wherein said housing further includes:
a third housing member, comprising:
a substantially flat first wall having a depending edge for overlapping engagement with an edge of said first and second housing members defined when said first and second housing members are connected by said connecting means, said first well having a fourth opening defined therethrough for communication with said third opening when said depending edge is in said overlapping engagement with said edge of said first and second housing members;
a second wall extending substantially perpendicularly from said first wall near the center thereof adjacent said fourth opening; and
a third wall extending from said second wall to said first wall at a spaced location from said second wall so that said second and third walls define a hollow interior region in said third housing member through said fourth opening; and
means for reversibly connecting said third housing member to said first and second housing members in a selectable one of a first position, wherein said third wall extends from said second wall in a direction toward said first housing member, and a second position, wherein said third wall extends from said second wall in a direction toward said second housing member, so that said article can be used with said valve oriented in either a left-hand position or a right-hand position.

4. An article for thermally insulating a valve at a well site, said valve having a first port and a second port, said article comprising:
a housing having a cavity defined therein for receiving said valve, having a first opening defined therein in communication with said cavity to provide access to said first port, having a second opening defined therein in communication with said cavity to provide access to said second port, and having a third opening defined therein in communication with said cavity, said housing including:
a first housing member having an exterior shape defined by a first surface having two edges and by a second surface extending between said two edges of said first surface at oblique angles thereto.
a second housing member having an exterior shape defined by a third surface having two edges and by a fourth surface extending between said two edges of said third surface at oblique angles thereto;
connecting means for connecting said first housing member to said second housing member about said valve so that said first surface is adjacent said third surface;
a third housing member, comprising:
a first wall having a depending edge for overlapping engagement with an edge of said first and second housing members defined when said first and second housing members are connected by said connecting means, said first wall having a fourth opening defined therethrough for communication with said third opening when said depending edge is in said overlapping engagement with said edge of said first and second housing members;
a second wall extending from said first wall adjacent said fourth opening; and
a third wall extending from said second wall to said first wall at a spaced location from said second wall so that a hollow interior region is defined in said third housing member through said fourth opening; and
means for reversibly connecting said third housing member to said first and second housing members.

5. An article as defined in claim 4, wherein:
said second wall has two holes defined therein; and
said article further comprises a plug having an opening eccentrically defined therethrough, said plug being releasably retainable in a selectable one of said two holes defined in said second wall so that an element of said valve can extend through said opening in said plug.

6. An article as defined in claim 5, wherein said first wall has an indentation defined therein for accommodating a set screw connectible to an actuating arm connectible to said element of said valve when said element extends through said opening in said plug.

7. An article as defined in claim 6, further comprising:
cover means, connectible to said first and second housing members, for covering a portion of said first opening; and
insert means, connectible to a pipe connected to said first port of said valve, for cooperating with said cover means to cover a greater portion of said first opening.

8. An article as defined in claim 4, further comprising:
cover means, connectible to said first and second housing members, for covering a portion of said first opening; and
insert means, connectible to a pipe connected to said first port of said valve, for cooperating with said cover means to cover a greater portion of said first opening.

9. An article as defined in claim 8, wherein said cover means includes:
a first molded piece having a first notch defined therein and having first mounting flange feet;
a second molded piece having a second notch defined therein and having second mounting flange feet; and
means for connecting said first mounting flange feet to said first housing member and said second mounting flange feet to said second housing member so that said first and second notches adjoin to define a generally elliptical opening over said first opening.

10. An article as defined in claim 9, wherein said insert means includes an insert member having an eccentrically positioned hole defined therein and having a cut defined therein between said hole and the periphery of said insert member through which said pipe is received into said eccentrically positioned hole.

11. An article for thermally insulating a valve at a well site, said valve having a first port and a second port collinearly disposed, said article comprising:
a housing having a cavity defined therein for receiving said valve, having a first opening defined therein in communication with said cavity to provide access to said first port, and having a second opening defined therein collinearly with said first opening and in communication with said cavity to provide access to said second port, said housing including:
a first housing member having a first portion of said cavity defined therein and having a first rim protruding from an edge of said first portion of said cavity;
a second housing member having a second portion of said cavity defined therein and having a second rim protruding from an edge of said second portion of said cavity;
first connecting means for connecting said first housing member to said second housing member about said valve so that said first and second rims adjoin to define a continuous lip along said edges of said first and second portions of said cavity;
a third housing member having a third portion of said cavity defined therein, said third portion having an open end; and
second connecting means for connecting said third housing member to said first and second housing members so that said continuous lip enters said third portion of said cavity through said open end when said third housing member is in a closed position adjacent both said first and second housing members.

12. An article as defined in claim 11, wherein said second connecting means includes:
hinge means for pivotally connecting said third housing member to said first and second housing members; and
latch means for releasably securing said third housing member to said first and second housing members in said closed position.

* * * * *

UNITED STATES PATENT AND TRADEMARK OFFICE
CERTIFICATE OF CORRECTION

PATENT NO. : 4,562,857
DATED : January 7, 1986
INVENTOR(S) : Randell D. Ball

It is certified that error appears in the above-identified patent and that said Letters Patent are hereby corrected as shown below:

Column 11, line 21 (claim 3), change "well" to --wall--.

Signed and Sealed this

Third Day of June 1986

[SEAL]

Attest:

Attesting Officer

DONALD J. QUIGG

Commissioner of Patents and Trademarks